(12) United States Patent
Dantlgraber

(10) Patent No.: US 6,527,540 B1
(45) Date of Patent: Mar. 4, 2003

(54) HYDROSTATIC DRIVE SYSTEM FOR AN INJECTION MOLDING MACHINE AND A METHOD FOR OPERATING SUCH A DRIVE SYSTEM

(75) Inventor: Jörg Dantlgraber, Lohr/Main (DE)

(73) Assignee: Bosch Rexroth AG, Lohr/Main (DE)

( * ) Notice: Subject to any disclaimer, the term of this patent is extended or adjusted under 35 U.S.C. 154(b) by 0 days.

(21) Appl. No.: 09/744,870
(22) PCT Filed: Jul. 20, 1999
(86) PCT No.: PCT/EP99/05154
§ 371 (c)(1), (2), (4) Date: Jan. 29, 2001
(87) PCT Pub. No.: WO00/07796
PCT Pub. Date: Feb. 17, 2000

(30) Foreign Application Priority Data

Aug. 1, 1998 (DE) .......................................... 198 34 826
Sep. 17, 1998 (DE) .......................................... 198 42 534

(51) Int. Cl.⁷ .............................................. B29C 45/67
(52) U.S. Cl. ..................... 425/589; 425/595; 264/328.1
(58) Field of Search ................................ 425/589, 595; 264/328.1

(56) References Cited

U.S. PATENT DOCUMENTS 5,852,933 A * 12/1998 Schmidt .................. 100/269.4

FOREIGN PATENT DOCUMENTS

DE                3202015            8/1983

(List continued on next page.)

OTHER PUBLICATIONS

Patent Abstracts of Japan vol. 6, No. 124 (M–141), Jul. 9, 1982 & JP 57 051438 A (Meiki Seisakusho K.K.), Mar. 26, 1982.

(List continued on next page.)

Primary Examiner—James P. Mackey
(74) Attorney, Agent, or Firm—Martin A. Farber

(57) ABSTRACT

A hydrostatic drive system for an injection molding machine which has a movable mold-closing plate comprises a hydraulic pump and a differential hydraulic cylinder, by which the mold-closing plate can be moved in the direction of the closing position by the feeding of pressure medium into the second pressure space remote from the piston rod and can be moved in the direction of the open position by the feeding of pressure medium into the first pressure space on the piston-rod side. Pressure medium can be delivered by the hydraulic pump into a pressure network having a hydraulic accumulator, and the first pressure space of the hydraulic cylinder is connected to the pressure network, and the hydraulic cylinder is controlled via a hydraulic transformer which is located with its primary-side pressure connection at the pressure network and via the secondary-side pressure connection of which pressure medium can be fed to the second pressure space of the hydraulic cylinder or discharged from the second pressure space. The high demand for pressure medium when the mold-closing plate is being closed during the speed-increasing acceleration phase can be covered to a high degree from the hydraulic accumulator. During the braking of the mold-closing plate, the hydraulic transformer can help to recharge the hydraulic accumulator. During the dead time, during which the mold-closing plate is stationary, the hydraulic accumulator can continue to be filled by the hydraulic pump.

9 Claims, 3 Drawing Sheets

FOREIGN PATENT DOCUMENTS

| | | |
|---|---|---|
| DE | 3718106 | 12/1988 |
| DE | 3805290 | 6/1989 |
| DE | 4416723 | 11/1995 |
| EP | 0135652 | 4/1985 |
| EP | 0167631 | 1/1986 |
| EP | 0427438 | 5/1991 |
| EP | 0851121 | 7/1998 |
| FR | 2317982 | 2/1977 |
| WO | 9623980 | 8/1996 |
| WO | 9710444 | 3/1997 |
| WO | 9731185 | 8/1997 |

OTHER PUBLICATIONS

"Hydrostatische Antriebe Mit Sekundärregelung", "Der Hydraulik Trainer" vol. 6, Second Edition, 1996, Mannesmann Rexroth AG., pp. 143–156.

Haas,H–J., Haaken, W.: "Neuartige Hydrostatische Antriebe: Sekundärregelung Bei Aufgeprägtem Druck," in Antriebs–Technik 2, 1987, No. 11, pp. 44, 46, 48, 51.

* cited by examiner

HYDROSTATIC DRIVE SYSTEM FOR AN INJECTION MOLDING MACHINE AND A METHOD FOR OPERATING SUCH A DRIVE SYSTEM

FIELD AND BACKGROUND OF THE INVENTION

The invention is based on a hydrostatic drive system for an injection molding machine, the closing unit of which has a movable mold-closing plate which can be moved by a differential hydraulic cylinder.

Various types of drive systems for the movable mold-closing plate of the closing unit of an injection molding machine are known.

Many publications show injection molding machines in which the drive system for the movable mold-closing plate comprises a rotary motor. Thus, for instance, EP 0 167 631 B1 shows an injection molding machine having an electric servomotor which drives a recirculating ball bush in a rotational manner via a pinion, a spindle which is firmly connected to the mold-closing plate extending through the recirculating ball bush. When the electric motor drives the recirculating ball bush, which is fixed in the direction of movement of the mold-closing plate, the spindle together with the mold-closing plate shifts in the axial direction. In an injection molding machine disclosed by EP 0 427 438 A1, an electric motor, via a plurality of gearing stages, drives a pinion meshing with a toothed rack. The toothed rack is firmly connected to the movable mold-closing plate and moves the latter, depending on the direction of rotation of the electric motor, in the closing direction or opening direction of the tool.

A drive system having a rotating hydraulic motor and intended for an injection molding machine has been disclosed by DE 37 18 106 A1. In this publication, a ball screw arranged in a fixed position in the axial direction is driven in a rotating manner via a first gear, which is firmly seated on the ball screw, a toothed belt and a second gear, which is fastened to the output shaft of a hydraulic motor. This rotating movement is converted via a recirculating ball bush into a linear movement of the movable mold-closing plate. A hydraulic motor is of much smaller construction than an electric motor at the same capacity, so that a compact machine construction is possible.

EP 0 135 652 A1 shows a hydrostatic drive system for an injection molding machine in which the movable mold-closing plate is moved by a differential hydraulic cylinder, that is by a hydraulic linear motor. The pressure spaces of the hydraulic cylinder are connected to two consumer connections of a 4/3-way directional control valve, which are shut off in a center position of the directional control valve and are connected in a lateral working position of the directional control valve to a hydraulic pump or a tank, depending on the direction of movement of the mold-closing plate. Pressure medium flowing through the directional control valve is subjected to throttling there, which entails losses of energy which cannot be utilized, these losses being related to the principle involved in the control of a hydraulic cylinder via a directional control valve.

SUMMARY OF THE INVENTION

The aim of the invention, for the movable mold-closing plate of an injection molding machine, is to provide a hydrostatic drive system in which only slight losses of energy which cannot be utilized occur.

This aim is achieved according to the invention by virtue of the fact that pressure medium can be delivered by the hydraulic pump into a pressure network having a hydraulic accumulator, that the first pressure space of the hydraulic cylinder is connected to the pressure network, and that the hydraulic cylinder is controlled via a hydraulic transformer which is located with its primary-side pressure connection at the pressure network and via the secondary-side pressure connection of which pressure medium can be fed to the second pressure space of the hydraulic cylinder or discharged from the second pressure space.

Compared with known hydrostatic drive systems having volumetric-flow coupling between the hydraulic pump and the hydraulic cylinder, the control valve is thus replaced by the direct connection of the pressure space on the piston-rod side to the pressure network and by the hydraulic transformer. Work is therefore carried out without throttling of the pressure-medium flow and without the resulting energy losses. The losses which occur are essentially only those caused by the efficiency of the hydraulic transformer.

In addition, in a hydrostatic drive system according to the invention, the installed power for driving the hydraulic pump, for two reasons, can be kept substantially lower than in a hydrostatic drive having volumetric-flow coupling. On the one hand, it is possible, even during the time when the movable mold-closing plate is stationary, that is when the mold is closed and when the mold is completely open, to drive the hydraulic pump by means of the drive motor and to charge the hydraulic accumulator during said dead time, so that a considerable amount of pressure medium under high pressure is available for the initial acceleration of the mold-closing plate during the closing operation and for the movement of the mold-closing plate during the opening, despite a small output of the drive motor. On the other hand, the kinetic energy of the mold-closing plate during the braking of the same is utilized in order to feed pressure medium into the hydraulic accumulator. Therefore some of the energy invested in the acceleration of the mold-closing plate is recovered during the braking. Only the losses of energy which cannot be utilized again have to be compensated for in each case by the hydraulic pump and the drive motor driving it.

The time during which the mold is closed may differ from that during which the mold is open. The drive motor and the hydraulic pump will in each case be constructed in such a way that, during the shorter dead time in each case, the hydraulic accumulator is charged to the pressure necessary for the following movement of the tool clamping plate.

During the longer dead time, the hydraulic pump can be stopped intermittently or switched to circulation of the pressure medium to the tank. In this case, according to features of the invention, a valve which can prevent a flow of pressure medium from the hydraulic accumulator to the hydraulic pump or to the tank is arranged between the hydraulic accumulator and the hydraulic pump. According to a feature of the invention, the valve is preferably a check valve which has a blocking action from the secondary side toward the hydraulic pump.

According to features of the invention, an electric motor whose rotational speed is variable via a control device is preferably used to drive the hydraulic pump. The hydraulic pump is preferably a constant-delivery pump. It is conceivable to drive the electric motor in each case with such a rotational speed that a pressure which is considered to be especially favorable for the motion cycle of the mold-closing plate prevails at the end of a dead time. However, it appears to be more favorable to operate the hydrostatic drive system according to a method of the invention. Accordingly, the electric motor is in each case operated with a rotational speed of high efficiency independently of the duration of the dead time during which the mold-closing plate rests and which may also vary from molding to molding. Finally, if a pressure which is considered to be favorable and is preset for the motion cycle of the mold-closing plate is achieved in the hydraulic accumulator, the electric motor is switched off. The efficiency losses are then especially low.

Hydrostatic drive systems having a hydraulic transformer between a pressure network and a hydraulic cylinder are generally known per se, so that more detailed explanations concerning their mode of operation are not necessary. In addition, reference is made to DE 32 02 015 C2, WO 97/31185 and the book "Hydrostatische Antriebe mit Sekundärregelung" [Hydrostatic drives with secondary control], which has appeared in the series "Der Hydraulik Trainer" as volume 6, second edition, 1996 and has been published by Mannesmann Rexroth AG. Cylinder controls having a hydraulic transformer at the pressure network are described in particular on pages 143 to 156 of the book.

BRIEF DESCRIPTION OF THE DRAWINGS

Three exemplary embodiments of a hydrostatic drive system according to the invention for an injection molding machine are shown in the drawings. The invention will now be explained in more detail with reference to these drawings, in which.

DETAILED DESCRIPTION OF THE PREFERRED EMBODIMENT

Figure 1:
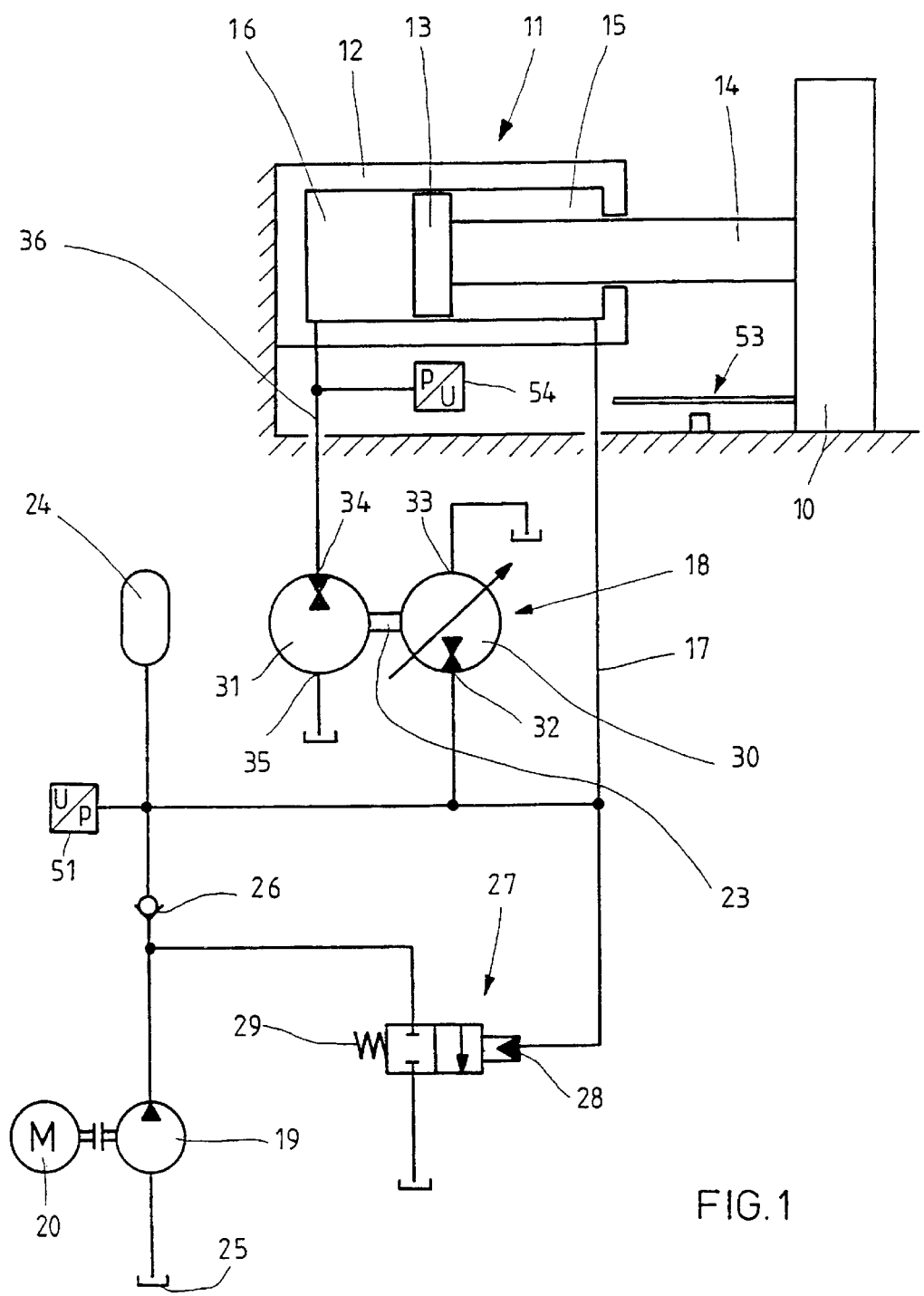
FIG. 1 shows the first exemplary embodiment, the hydraulic transformer of which comprises two hydraulic machines which are mechanically coupled to one another and of which the one located at the pressure network is adjustable.

The mold-closing plate of a plastics injection molding machine is designated by 10 in the drawings. In a manner not shown in any more detail, this mold-closing plate is guided rectilinearly on the frame of the plastics injection molding machine and can be moved in two opposite directions by a hydraulic cylinder 11. The hydraulic cylinder 11 is a differential hydraulic cylinder and has a piston 13 in a cylinder housing 12, and projecting from one side of this piston 13 is a piston rod 14, which emerges from the cylinder housing 12 at one end face and to which the mold-closing plate 10 is fastened. In the interior of the cylinder housing 12, the piston 13 separates an annular, first pressure space 15 on the piston-rod side from a fully cylindrical, second pressure space 16 remote from the piston rod.

The hydraulic cylinder 11 belongs in each case to a hydrostatic drive system, which has a secondary-controlled subsystem and is characterized essentially by a pressure line 17 having an imposed pressure and by a hydraulic transformer 18. The pressure-medium source is a hydraulic pump 19, which can be driven by a drive motor 20 and can deliver pressure medium, which it draws in from a tank 25, into the pressure line 17. The hydraulic pump 19 has a constant stroke volume and can thus force the same quantity of pressure medium into the pressure line 17 during every revolution of its drive shaft.

The pressure medium is delivered into the pressure line 17 via a check valve 26, the blocking action of which is toward the hydraulic pump 19. It may sit directly on the housing of the hydraulic pump.

Connected to the pressure line 17 is a hydraulic accumulator 24, by means of which larger and rapid pressure fluctuations in the pressure line 17 are avoided and which serves to store pressure medium at a high pressure level. There may of course also be a plurality of hydraulic accumulators 24.

Figure 2:
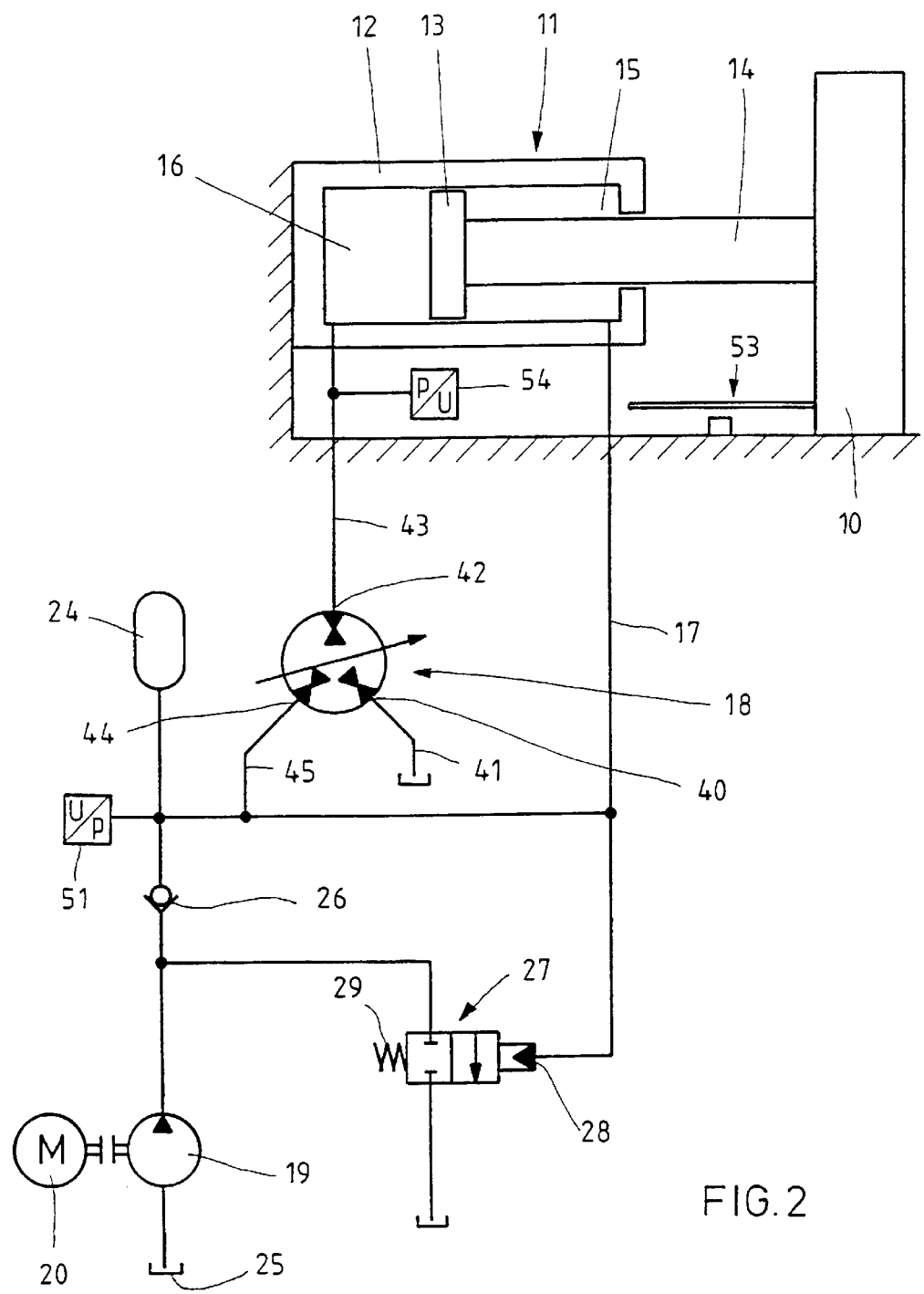
FIG. 2 shows the second exemplary embodiment having a hydraulic transformer of different construction.

In the embodiments according to FIGS. 1 and 2, the inlet of an accumulator loading valve 27 (shown in simplified form) is connected to the delivery outlet of the hydraulic pump 19 upstream of the check valve 26, the pressure prevailing in the pressure line 17 and in the hydraulic accumulator 24 being applied to a control area 28 of the accumulator loading valve 27, the valve member of the latter being preloaded in the closed position by a compression spring 29. The outlet of the accumulator loading valve 27 is connected to the tank 25. The accumulator loading valve 27 is closed as long as the force produced on the control area 28 by the pressure in the hydraulic accumulator 24 is less than the force of the compression spring 29. The hydraulic pump 19 then delivers pressure medium into the pressure line 17 and into the hydraulic accumulator 24. If the accumulator pressure reaches a maximum value set at the accumulator loading valve, the accumulator loading valve opens, so that the hydraulic pump 19 has a circulating delivery to the tank. If the accumulator pressure has dropped below a set minimum value, the accumulator loading valve closes again.

The hydraulic transformer 18 of the depicted hydrostatic drive systems according to the invention partly belongs to the secondary-controlled subsystem inasmuch as pressure medium can flow off from the pressure line 17 to the tank 25 via said hydraulic transformer 18 and can be delivered from the tank into the pressure line.

Figure 3:
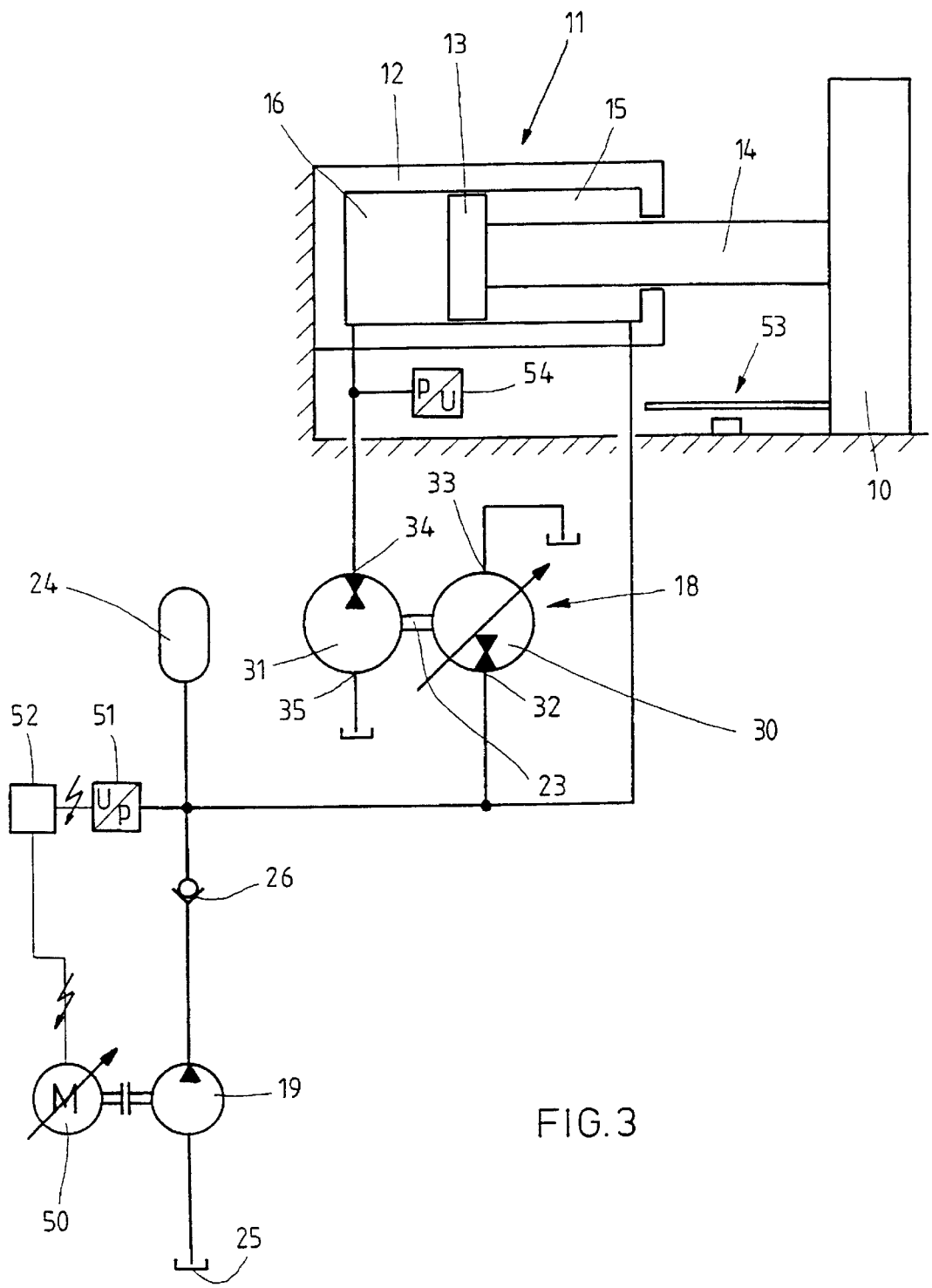
FIG. 3 shows the third exemplary embodiment, the hydraulic pump of which is driven by a variable-speed electric motor.

In the two embodiments according to FIGS. 1 and 3, the hydraulic transformer comprises two hydraulic machines 30 and 31 mechanically coupled to one another via a shaft 23, e.g. of two axial piston machines, which can both work as hydraulic pumps and, after reversal of the direction of rotation, as hydraulic motors. The hydraulic machine 30 is the secondary unit of the secondary-controlled subsystem, is connected with a pressure connection 32 to the pressure line 17 and with a tank connection 33 to the tank 25, and is adjustable in its stroke volume between zero and a maximum value. The hydraulic machine 31 has a constant stroke volume. A pressure connection 34 of it is connected to the second pressure space 16 of the hydraulic cylinder 11 via a line 36, and a tank connection 35 is connected to the tank 25.

It is also possible, instead of a hydraulic machine having a constant stroke volume, to use one having an adjustable stroke volume. The hydraulic machines 30 and 31 must then be adjusted in opposite directions.

The hydraulic transformer 18 of the embodiment according to FIG. 2, as indicated by the different symbol, is of different construction from that of the embodiments according to FIGS. 1 and 3. In a barrel which is rotatable relative to a swash plate, it has a number of axial pistons arranged at an equal distance from the axis of rotation of the barrel and having rear working spaces, which are open toward a control disk. The latter has three control slots, which extend over the same radian measure and of which one control slot 40 is connected to the tank 25 via a line 41, one control slot 42 is connected to the pressure space 16 of the hydraulic cylinder 11 via a line 43, and one control slot 44 is connected to the pressure line 17 via a line 45. The control disk is rotatable relative to the barrel having the axial pistons, so that the region at the swash plate on which an axial piston is supported during the fluidic connection of the working space behind the axial piston to one of the control slots can be varied by rotation of the control disk.

For example, if the working spaces are connected to a control slot in a symmetrical manner to a dead center of the axial movement of the axial pistons, pressure medium flows neither in nor out via this control slot. A hydraulic transformer as used in the drive system according to FIG. 2 is described in detail in WO 97/31185, to which reference is explicitly made here.

The hydraulic transformer used may also be an axial piston machine having a barrel which has two rows of piston bores on different diameters, the piston bores accommodating axial pistons. Such a hydraulic machine is described, for example, in the published European Patent Application EP 0 851 121 A1. Hydraulic transformers working in a timed sequence, as disclosed in the published International Application WO 96/23980 and the published International Application WO 97/10444 of the applicant, may also be used. Reference is expressly made here to said publications.

In the exemplary embodiment according to FIG. 3, the hydraulic pump 19 can be driven by an electric motor 50, the rotational speed of which can be varied. The pressure in the hydraulic accumulator 24 is detected by a pressure sensor 51 and converted into an electrical signal, which is delivered to an electric control unit 52. The latter, as a function of its programming and as a function of further operating parameters which are fed to it in a manner not shown in any more detail, sets the rotational speed of the electric motor 50 or presets it at zero rotational speed.

To control the position and the speed, a displacement transducer 53 is assigned to the unit comprising the mold-closing plate 10, piston rod 14 and piston 13. The pressure in the pressure space 15 is detected by a pressure sensor 51 even in the embodiments according to FIGS. 1 and 2, and the pressure in the pressure space 16 of the hydraulic cylinder is detected by a pressure sensor 54 in all the embodiments shown.

In the two embodiments according to FIGS. 1 and 3, the piston 13 together with the mold-closing plate 10 is located in the rest position if the hydraulic machine 31, driven as a pump by the hydraulic machine 30 or driving the hydraulic machine 30 as a motor depending on the magnitude and direction of the leakage flows, maintains a pressure in the pressure space 16 of the hydraulic cylinder 11, the ratio of this pressure to the pressure in the pressure space 15 and thus in the hydraulic accumulator 24 being equal to the ratio of the annular area to the full area at the piston 13.

To accelerate the mold-closing plate 10, the hydraulic machine 30 works as a hydraulic motor and is set to a large stroke volume. The hydraulic machine therefore produces a high torque and accelerates the hydraulic machine 31, which works as a hydraulic pump and draws in pressure medium from the tank and delivers it into the pressure space 16 of the hydraulic cylinder. The hydraulic machine 30 takes more pressure-medium quantity from the hydraulic accumulator 24 than is delivered into the hydraulic accumulator and displaced from the pressure space 15 into the hydraulic accumulator by the hydraulic pump 19. The pressure in the pressure line 17 and in the hydraulic accumulator 24 therefore decreases. This is compensated for by an increase in the tilt angle of the hydraulic machine 30. As soon as the mold-closing plate 10 has reached its maximum speed, the hydraulic machine 30 swings back to such an extent that only frictional losses are compensated for by the torque delivered by it. The rotational speed of the hydraulic machine 31 and thus the speed of the mold-closing plate 10 are then constant.

To brake the mold-closing plate 10, the hydraulic machine 30 is swung back. The two hydraulic machines 30 and 31 reduce their rotational speed while maintaining their direction of rotation, so that the pressure in the pressure space 16 of the hydraulic cylinder drops. The mold-closing plate is braked by the force produced on the annular area of the piston 13 by the pressure in the pressure space 15, in the course of which pressure medium continues to be displaced from the pressure space 15 into the pressure line 17. It may well be the case that, before the final closing of the mold, the braking operation is complete and the hydraulic machine 30 swings out again slightly until the mold-closing plate 10 has reached its closing position with relatively slow travel. In the closing position, the mold-closing plate can be locked independently of the hydraulic cylinder 11, so that the hydraulic machine 30 can be swung back to zero tilt angle. However, it is also conceivable to keep the mold closed by a high pressure in the pressure space 16 of the hydraulic cylinder 11, the requisite pressure or the requisite pressure profile being maintained in the pressure space 16 for the time of the injection operation by the setting of the tilt angle of the hydraulic machine 30.

During the dead time, during which the mold is closed, the hydraulic pump 19 continues to deliver pressure medium into the hydraulic accumulator 24 until the accumulator loading valve 27 responds.

To open the mold, the pressure in the pressure space 16 of the hydraulic cylinder 11 is reduced to such an extent that the force produced on the annular area of the piston 13 by the accumulator pressure prevailing in the pressure space 15 exceeds (acceleration) or, taking into account frictional forces, is equal to the counterforce (constant speed). To this end, the tilt angle of the hydraulic machine 30 is set according to the desired acceleration and speed of the mold-closing plate. The hydraulic machine 31 now works as a hydraulic motor, via which the pressure medium displaced from the pressure space 16 flows off to the tank 25. The hydraulic machine 30 works as a hydraulic pump, which is driven by the hydraulic motor 31 and delivers pressure medium from the tank 25 into the pressure line 17. The direction of rotation of the shaft 23 of the two hydraulic machines 30 and 31 is opposed to the direction of rotation during the closing of the mold. To brake the mold-closing plate before reaching its open position, the tilt angle of the hydraulic machine 30 is increased. The mold-closing plate can be held in the open position by a stop, so that the hydraulic machine 30 can be swung back to zero. However, it is also possible, as already described further above, to set the tilt angle of the hydraulic machine 30 and thus the pressure in the pressure space 16 to such a value that there is equilibrium of forces at the piston 13.

In the embodiment according to FIG. 2, the hydraulic transformer used there is in principle controlled in exactly the same way as in the embodiments according to FIGS. 1 and 3. For the control, however, the swash plate is not tilted, but rather the control disk is rotated relative to the swash plate.

In the embodiment according to FIG. 3, the electric motor 50, during the closing movement of the mold-closing plate 10, drives the hydraulic pump 19 with a rotational speed at which there is a high efficiency. The pressure in the hydraulic accumulator 24 decreases. During the dead time following the closing movement, the hydraulic pump 19 continues to be driven by the electric motor 50 until the pressure in the hydraulic accumulator 24 reaches a preset value. As soon as the pressure sensor 51 indicates this pressure, the control unit 52 switches off the electric motor 50. The check valve 26 prevents pressure medium from escaping to the tank 25 from the hydraulic accumulator 24 via the hydraulic pump 19 during the switch-off time of the electric motor 50. If the injection molding operation is complete and the workpiece has cooled down to dimensional stability, a considerable amount of pressure medium is immediately consumed for accelerating the mold-closing plate 10 in the opening direction, this pressure medium flowing off to the tank 25 from the hydraulic accumulator 24 via the hydraulic machine 30. The electric motor 50 is switched on, so that at least some of the pressure medium flowing off is replaced by the pump 19. Depending on how long the mold-closing plate is in the open position until the start of the next closing movement, the electric motor 50 is also switched off for a certain time in the open position of the mold-closing plate.

I claim:

1. A hydrostatic drive system for an injection molding machine which has a movable mold-closing plate (10), having a hydraulic cylinder (11) which has an annular, first pressure space (15) on one side of a piston (13), a piston-rod side, and a second pressure space (16) on an other side of the piston (13), a side remote from the piston rod, and via which the mold-closing plate (10) is movable in direction of a closing position by feeding of pressure medium into the second pressure space (16) and is moveable in direction of an open position by feeding of pressure medium into the first pressure space (15), and having a hydraulic pump (19), wherein pressure medium is deliverable by the hydraulic pump (19) into a pressure network (17, 24) having a hydraulic accumulator (24), and the first pressure space (15) of the hydraulic cylinder (11) is connected to the pressure network (17, 24), and the hydraulic cylinder (11) is controlled via a hydraulic transformer (18) which is located with its primary-side pressure connection (32, 44) at the pressure network (17, 24) and via the secondary-side pressure connection (32, 42) of which pressure medium is feedable to the second pressure space (16) of the hydraulic cylinder (11) or discharged from the second pressure space (16).

2. The hydrostatic drive system as claimed in claim 1, wherein a secondary-side hydraulic machine (31) of the hydraulic transformer (18) has a constant stroke volume.

3. The hydrostatic drive system as claimed in claim 1, wherein the hydraulic transformer comprises two hydraulic machines adjustable in their stroke volume in opposite directions.

4. The hydrostatic drive system as claimed in claim 1, wherein the hydraulic transformer includes means for timing whereby said hydraulic transformer works in a sequence timed by said timing means.

5. The hydrostatic drive system as claimed in claim 1, further comprising a valve (26) which can prevent a flow of pressure medium from the hydraulic accumulator (24) to the hydraulic pump (19), said valve (26) is arranged between the hydraulic accumulator (24) and the hydraulic pump (19).

6. The hydrostatic drive system as claimed in claim 5, wherein the valve (26) is a check valve which has a blocking action from the hydraulic accumulator (24) toward the hydraulic pump (19).

7. The hydrostatic drive system as claimed in claim 1, wherein the piston rod extends only on one side of the hydraulic cylinder.

8. The hydrostatic drive system as claimed in claim 1, wherein the hydraulic pump (19) is drivable by an electric motor (50), and rotational speed of the electric motor (50) is variable via an electric control unit (52).

9. A method of operating a hydrostatic drive system as claimed in claim 8, comprising the step of switching on and off the electric motor (50) intermittently.

* * * * *